(12) United States Patent
Johannesson et al.

(10) Patent No.: US 7,224,833 B2
(45) Date of Patent: May 29, 2007

(54) METHOD FOR FAST COLOR SATURATION CONTROL

(75) Inventors: Anders Johannesson, Lund (SE); Ingemar Larsson, Lund (SE)

(73) Assignee: Dialog Imaging Systems GmbH, Kirchheiml Teck-Nabern (DE)

( * ) Notice: Subject to any disclaimer, the term of this patent is extended or adjusted under 35 U.S.C. 154(b) by 1022 days.

(21) Appl. No.: 10/271,300

(22) Filed: Oct. 15, 2002

(65) Prior Publication Data

US 2004/0057060 A1 Mar. 25, 2004

(30) Foreign Application Priority Data

Sep. 25, 2002 (EP) .................... 02368102

(51) Int. Cl.
*G06K 9/00* (2006.01)

(52) U.S. Cl. ..................... 382/167; 358/520

(58) Field of Classification Search ........ 382/162–167, 382/274–275, 168–169; 358/1.9, 516–523, 358/572; 348/221.1, 222.1, 645–653; 345/589–604; 355/38, 32–45

See application file for complete search history.

(56) References Cited

U.S. PATENT DOCUMENTS

| | | | |
|---|---|---|---|
| 4,154,523 A * | 5/1979 | Rising et al. | 355/38 |
| 4,499,486 A | 2/1985 | Favreau et al. | 348/649 |
| 4,605,954 A * | 8/1986 | Bestenreiner et al. | 348/645 |
| 4,831,434 A | 5/1989 | Fuchsberger | 358/521 |
| 5,555,031 A * | 9/1996 | Van Rooij | 348/645 |
| 5,561,474 A | 10/1996 | Kojima et al. | 348/653 |
| 5,852,502 A | 12/1998 | Beckett | 358/512 |
| 6,771,311 B1 * | 8/2004 | Weldy | 348/222.1 |
| 6,826,302 B2 * | 11/2004 | Okada et al. | 382/167 |
| 7,092,122 B2 * | 8/2006 | Iwaki | 358/1.9 |

FOREIGN PATENT DOCUMENTS

| | | |
|---|---|---|
| EP | 781036 A1 | 6/1997 |
| GB | 2198008 A | 6/1988 |

* cited by examiner

*Primary Examiner*—Ishrat Sherali
(74) *Attorney, Agent, or Firm*—Saile Ackerman LLC; Stephen B. Ackerman

(57) ABSTRACT

A method for a fast color saturation control of digital color images using one color saturation factor has been achieved. Said method can be performed in any color space having three primaries as e.g. the R-G-B or in the CMY color space without the requirement to convert all the pixels of said color image into another color space as e.g. HSI to perform the color saturation control. Thus a significant computational effort for the conversion of the pixels from one color space into another and back can be avoided. Saving computational effort saves time and reduces the electrical power consumption. Right after the color saturation control process the corrected images can be viewed, if the colors are not satisfactory the process can be easily repeated using a modified color saturation factor. Said method can be used for new pictures taken by a digital camera as well as for downloaded pictures from any source. Additionally said method of color saturation control can be combined with a color correction process.

38 Claims, 3 Drawing Sheets

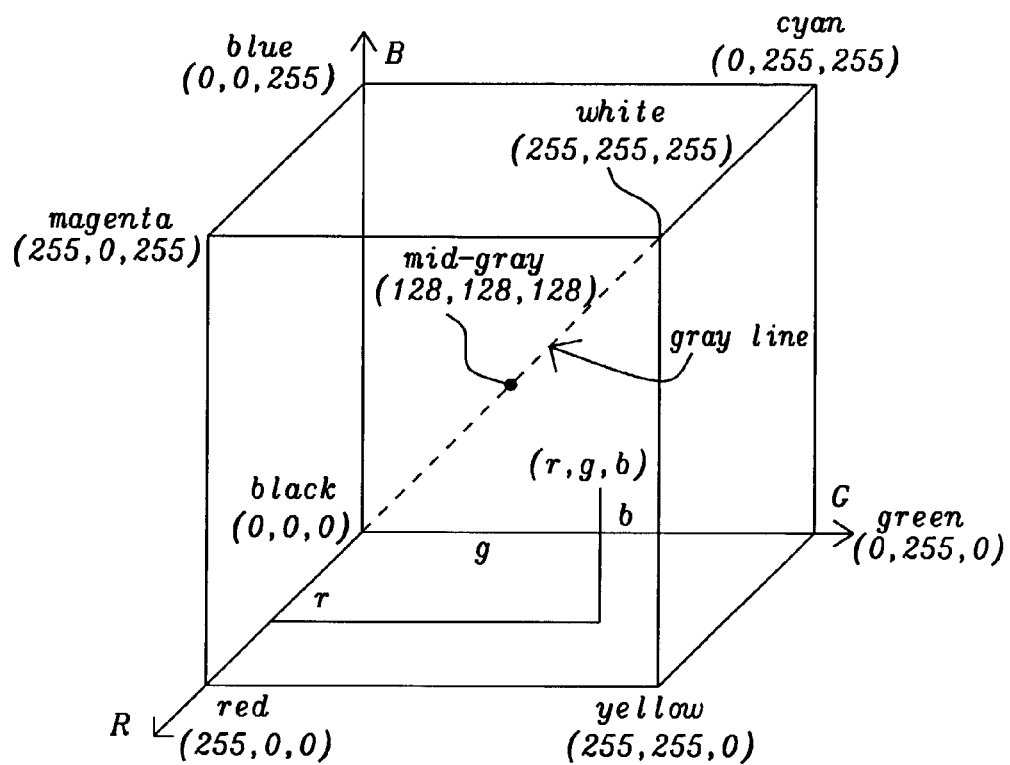
FIG. 1 – Prior Art
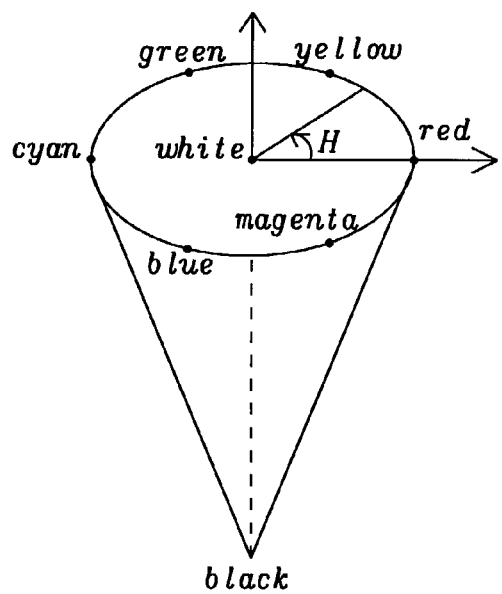
FIG. 2 – Prior Art

METHOD FOR FAST COLOR SATURATION CONTROL

BACKGROUND OF THE INVENTION (1) Field of the Invention

This invention relates generally to digital color image processing and relates more particularly to a method for a fast digital color saturation control with low computational effort.

(2) Description of the Prior Art

Color is the perceptual result of light in the visible region of the spectrum, having wavelengths in the region of 400 nm to 700 nm, incident upon the retina. The spectral distribution of light relevant to the human eye is often expressed in 31 components each representing a 10 nm band.

The human retina has three types of color photoreceptors cone cells, which respond to incident radiation with somewhat different spectral response curves. Because there are exactly three types of color photoreceptor, three numerical components are necessary and sufficient to describe a color, providing that appropriate spectral weighting functions are used.

Pixel values in accurate gray-scale images are based upon broadband brightness values. Pixel values in accurate color images are based upon tristimulus values. Color images are sensed and reproduced based upon tristimulus values, whose spectral composition is carefully chosen according to the principles of color science. As their name implies, tristimulus values come in sets of three. In most imaging systems, tristimulus values are subjected to a non-linear transfer function that mimics the lightness response of vision. Most imaging systems use RGB values whose spectral characteristics do not exactly match the tristimulus values of the human eyes.

A combination of real world physical characteristics determines what the human vision system perceives as color. A color space is a mathematical representation of these characteristics. Color spaces are often three-dimensional. There are many possible color space definitions.

Digital imagery often uses red/green/blue color space, known simply as RGB. Said RGB space is illustrated in FIG. 1 prior art. The red/green/blue values start at zero at the origin and increase along the three axes. Because each color can only have values between zero and some maximum (255 for 8-bit depth), the resulting structure is a cube. We can define a color simply by giving its red, green, and blue values, or coordinates, within the color cube. These coordinates are usually represented as an ordered triplet. Several colors are shown in FIG. 1 prior art mapped into their locations in the 8-bit RGB cube, or color space. Black has zero intensity in red, green, or blue, so it has the coordinates (0,0,0). At the opposite corner of the color cube, white has maximum intensities of each color, or (255, 255, 255). Cyan, magenta and yellow, which are combinations of green and blue, red and blue, and red and green, respectively, are at (0, 255, 255), (255, 0, 255) and (255, 255,0). Finally, note that a middle gray is at the exact center of the cube at location (128, 128,128). Other colors can be described by specifying their coordinates within this cube.

The Cyan, Magenta, Yellow, known as CMY, is often used in printing. The CMY color space is related to the RGB space by being inverse of it. The origin of this color space is not black, but is white, and the primary axes of the coordinate system are not red, green and blue but are cyan, yellow and magenta. The color red in this space is a combination of yellow and magenta, while green is composed of yellow and cyan. In the printing industry, where images start with a white piece of paper (the origin) and ink is applied to generate colors, the CMY color space is commonly used.

Another color space, often used by artists, is Hue, Saturation and Intensity (or HSI). In this color space scenes are not described in terms of red, green, and blue, but as hue, saturation, and intensity (HSI). We see things as colors, or hues that either have a washed-out look or have deep, rich tones. This means having low or high saturation, respectively. Hue is the attribute of a visual sensation according to which an area appears to be similar to one of the perceived colors, red, green and blue, or a combination of them. Saturation is the colorfulness of an area judged in proportion to its brightness.

Images that digital cameras deal with are often obtained through tri-color filter sets, like RGB or CMY, and normally the processing of the images are done in either RGB or CMY color space. Some image operations are, however, complicated to perform in these color spaces, but become trivial in a different color space. This is the case with saturation control, which is best done in HSI space. This is obvious since saturation is one of the original coordinates of HSI. The conversion between color spaces, however, requires significant computer power that takes time and consumes significant electrical power in a battery-powered device as e.g. a digital camera.

By color saturation control is meant the process to increase or decrease the amount of color in an image without changing the image contrast. When saturation is lowered the amount of white in the colors is increased (washed out). By adjusting the color saturation the same image can be everything from a black and white image to a fully saturated image having strong colors.

The color saturation control is best explained using the Hue, Saturation, and Intensity (HSI) color space as shown in FIG. 2 prior art. HSI is a very different three-dimensional color space from RGB or CMY. FIG. 2 prior art illustrates a common representation of HSI color space. The cone shape has one central axis representing intensity. Along this axis are all gray values, with black at the pointed end of the cone and white at its base. The greater the distance along this line from the pointed end, or origin, the brighter or higher is the intensity. If the cone is viewed from above, it becomes a circle. Different colors, or hues, are arranged around this circle—the familiar color wheel used by artists. Hues are determined by their angular location on this wheel. Saturation, or richness of color, is defined as the distance perpendicular to the intensity axis. Colors near the central axis have low saturation and look pastel. Colors near the surface of the cone have high saturation.

In prior art said HSI color space is used to change the color saturation of an image. This is relatively simple to do in HSI color space. First, the original image would have to be converted to HSI. Second, the saturation would be modified. Said modification of the saturation is simple because saturation is one of three coordinates of the HSI color space and thus only one coordinate of the pixels has to be changed. The other two coordinates remain unchanged. Finally, the image would have to be converted back to RGB. The same process applies to the CMY color space, which is very close in structure to the RGB color space. The image would have to be converted from CMY to HSI, then the color saturation would have to be modified and finally it would have to be converted back to CMY. It is obvious that a significant computational effort is required for all these conversions.

U.S. Pat No. (5,555,031 to Van Rooij) describes how in a video signal processing circuit, an adaptive signal compression is realized by correcting the color saturation by multiplication of color difference signals (R-Y, G-Y) by a same correction factor in such a way that color signal values (R, G, B) remain below their respective maximally allowed values without the luminance (Y) being limited as well. Preferably, the correction factor is obtained in dependence upon a non-linearly compressed luminance signal (Y').

U.S. Pat. No. (5,561,474 to Kojima et al.) discloses a video camera having a processing circuit, which converts electrical signals obtained from an imager into a luminance signal and color-difference signals. The color video camera further includes a memory, which stores a table of values designating color saturation levels and corresponding to a specific hue of a background color. The memory outputs a color saturation level based on the color difference signals obtained by imaging an object on a background of the specific hue. This color saturation level is compared with the luminance signal, and based on the comparison results the luminance signal and color difference signals are separated into components corresponding to the background area and components corresponding to the object area.

U.S. Pat. No. (5,852,502 to Beckett) shows an apparatus and a method for producing series of high-resolution color composite images. The digital camera has an optical assembly that directs visual images to a high-resolution monochrome sensor and a lower resolution color sensor. During the processing of the composite image, the monochrome grayscale value becomes the composite frame grayscale value, the color frame hue value becomes the composite frame hue value, and the color frame saturation value becomes the composite frame saturation value. Processing of the monochrome and color images is achieved on the pixel level. A processor calculates the grayscale value for each pixel in each successive monochrome and color image frame. The processor also calculates the hue value (color) and the saturation value (amount of color) for each pixel in each successive color image frame.

SUMMARY OF THE INVENTION

A principal object of the present invention is to achieve a method for a fast color saturation control of digital color images with low computational effort.

Another object of the present invention is to achieve a method to combine a fast color saturation control with a color correction of digital color images.

In accordance with the principal object of the invention a method for a fast color saturation control of digital color images in any color space having three primaries has been achieved. Said method comprises first to set a color saturation control factor f, followed by inserting said color saturation factor f in a suitable way in a color saturation matrix M. The next steps comprise to multiply said color saturation matrix with all pixel values of the image in the color space selected, to send said image to a display and view the colors and to select a new color saturation control factor and repeat process if colors are not satisfactory.

In accordance with the primary object of this invention a method for a fast color saturation control of digital color images in the R-G-B color space has been achieved. Said method, first, comprises as first step to set a color saturation control factor f, followed by inserting said color saturation factor in a suitable way in a color saturation matrix M. The next steps comprise to multiply said color saturation matrix with all pixel values of the image in the R-G-B color space, to send said image to a display to view the colors and to select a new color saturation control factor and repeat the process if the colors are not satisfactory.

In accordance with the primary object of this invention a method for a fast color saturation control of digital color images in the C-M-Y color space has been achieved. Said method, first, comprises as first step to set a color saturation control factor f, followed by inserting said color saturation control factor in a suitable way in a color saturation matrix M. The next steps comprise to multiply said color saturation matrix with all pixel values of the image in the C-M-Y color space, to send said image to a display to view the colors and to select a new color saturation control factor and repeat the process if the colors are not satisfactory In accordance with the objects of this invention a method to combine a fast color saturation control of digital color images with a color error correction in a color space having three primaries has been achieved. Said method, first, comprises as first step to obtain values of a color correction matrix, followed by calculating corrected values in a vector N for the primary colors of the color space selected. The next steps comprise to set a color saturation control factor f, to insert said color saturation factor f in a suitable way in said color saturation matrix M and to multiply said color saturation matrix with all pixel values of the image in the color space selected to obtain a vector S for each pixel. Furthermore the last steps comprise to multiply said vector S with said vector N for each pixel of the image to combine the color saturation control and color correction, to send said image to a display to view the colors and to select a new color saturation control factor and repeat color saturation control if the colors are not satisfactory.

BRIEF DESCRIPTION OF THE DRAWINGS

In the accompanying drawings forming a material part of this description, there is shown:

FIG. 1 prior art illustrates a RGB color space.

FIG. 2 prior art shows a HSI color space.

DESCRIPTION OF THE PREFERRED EMBODIMENTS

The preferred embodiments disclose a method to achieve a fast color saturation control with low computational effort.

As outlined in the prior art section the color saturation control is easy to perform in the HSI color space. But it is obvious that a significant computational effort is required for the conversions of all the pixels from RGB or CMY color space to HSI color space and back to the original space. This invention achieves the color saturation control performed all in the RGB or in the CMY color space without the requirement of conversions into other color spaces. The total computational effort is reduced significantly thereby and thus, the color saturation is performed much faster and the power consumption, especially important in battery powered devices, is much lower compared to prior art.

A novel approximation to color saturation control has been developed that can be applied directly in RGB, CMY or in any other color space based on three primaries:

$$S_1 = f \times I_1 - (f-1) \times (I_1 + I_2 + I_3)/3$$

$$S_2 = f \times I_2 - (f-1) \times (I_1 + I_2 + I_3)/3$$

$$S_3 = f \times I_3 - (f-1) \times (I_1 + I_2 + I_3)/3$$

In this equation $I_1$, $I_2$, and $I_3$ represent the color components of one single pixel in the image to be affected, f is a saturation control factor, and $S_1$, $S_2$, and $S_3$ represent the color components as result of the color saturation process. For f=1 the image is not affected. For f<1.0 the color saturation is decreased and in the extreme case when f=0 all the color components are replaced by the average color component level in that pixel, and thus the image becomes a grayscale image. For f>1 the color saturation is enhanced due to the saturation factor f, but contrast is preserved due to the subtraction of a fraction of the average level. For a gray pixel all the components have the same value and thus will be unaffected.

Above-mentioned equation can be written in matrix form:

$$\begin{bmatrix} S_1 \\ S_2 \\ S_3 \end{bmatrix} = \frac{1}{3} \times \begin{bmatrix} 2f+1 & 1-f & 1-f \\ 1-f & 2f+1 & 1-f \\ 1-f & 1-f & 2f+1 \end{bmatrix} \times \begin{bmatrix} I_1 \\ I_2 \\ I_3 \end{bmatrix}$$

Said modified equation is a very suitable model to be used by a microprocessor or a dedicated circuit.

Figure 3:
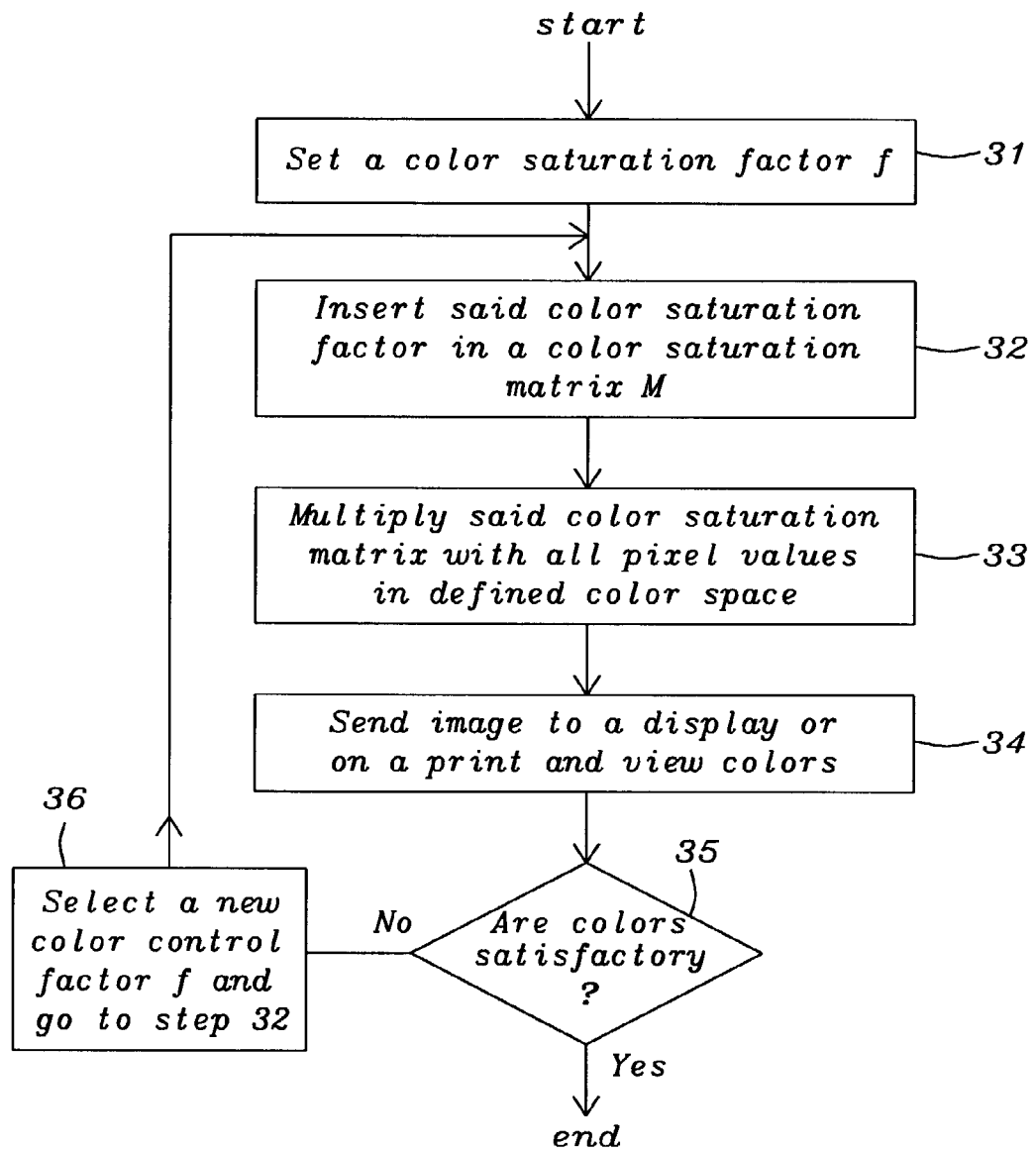
FIG. 3 shows a flowchart of a method how to achieve color saturation control.

FIG. 3 describes a method how to control the color saturation without the requirement to transfer the image into another color space. The first step 31 describes the setting of a saturation factor f. The supplier of imaging devices as e.g. TV sets, digital cameras, phones, etc. can offer the selection of said control factor by a menu. The next step 32 describes that said color saturation factor is used to build a matrix. In a preferred embodiment said color saturation matrix M has the following components as described above:

$$M = \frac{1}{3} \times \begin{bmatrix} 2f+1 & 1-f & 1-f \\ 1-f & 2f+1 & 1-f \\ 1-f & 1-f & 2f+1 \end{bmatrix}.$$

The following step 33 shows that all pixels of the image are transformed by a multiplication of all pixel values with said color saturation matrix M. In the next step 34 the modified image is sent to a display or printed and can be viewed. In step 35 illustrates the decision if the colors are satisfactory. If the answer is yes the saturation control is done. If the answer is no a new color saturation control factor f can be selected in step 36 and the whole process can be repeated going back to step 32.

The advantage of said method invented is that the colors used can be improved as seen by eye on a display or on a print. The same process applies for new images taken by a digital camera as well as for color images downloaded e.g. from the Internet, scanned by a scanner or digital images in a TV set, etc. Said saturation control can be used in any color space based on three primaries.

Said method invented can be combined with a color correction of images using a color correction matrix C. Said color correction matrix describes the error in the camera's reproduction of colors. The matrix is obtained through imaging of a calibrated color target. The coefficients of said matrix C are selected so that the color reproduction is optimized. Said matrix C is a 3×3 matrix correcting each of the three primary colors of the color space selected. For a RGB sensor the color correction matrix C is:

$$R_n = C_{11} \times R + C_{12} \times G + C_{13} \times B$$

$$G_n = C_{21} \times R + C_{22} \times G + C_{23} \times B$$

$$B_n = C_{31} \times R + C_{32} \times G + C_{33} \times B$$

wherein $R_n$, $G_n$ and Bn are the corrected values of Red, Green and Blue.

The elements of said color correction C are specific for a certain camera. They are numerically high for cameras with poor color filters. By poor is meant bandpasses that differ much from those of ideal filters. The matrix is also affected by the spectral sensitivity of the sensor itself (without filters) and possibly by other optics. A vector N can be used for the processing of the corrected values of red, green and blue:

$$N = \begin{bmatrix} R_N \\ G_N \\ B_N \end{bmatrix}$$

wherein $R_n$, $G_n$ and $B_n$ comprise the corrected values for Red, Green and blue as described above.

The color correction process can be combined with the color saturation control by multiplying said color correction vector N with said color saturation matrix M as described above. The result is a vector A containing modified color components as result of the color saturation control and the color correction process combined:

$$A = M \times N \times I$$

or e.g. in a RGB color space:

$$\begin{bmatrix} A_1 \\ A_2 \\ A_3 \end{bmatrix} = \frac{1}{3} \times \begin{bmatrix} 2f+1 & 1-f & 1-f \\ 1-f & 2f+1 & 1-f \\ 1-f & 1-f & 2f+1 \end{bmatrix} \times \begin{bmatrix} R_N \\ G_N \\ B_N \end{bmatrix} \times \begin{bmatrix} I_1 \\ I_2 \\ I_3 \end{bmatrix}$$

wherein $A_1$, $A_2$ and $A_3$ represent the modified color components of one single pixel in the image, f is said saturation control factor, $R_N$, $G_N$ and $B_N$ represent said color correction values for red, green and blue and $I_1$, $I_2$ and $I_3$ represent the color components of one single pixel in the image to be affected.

Figure 4:
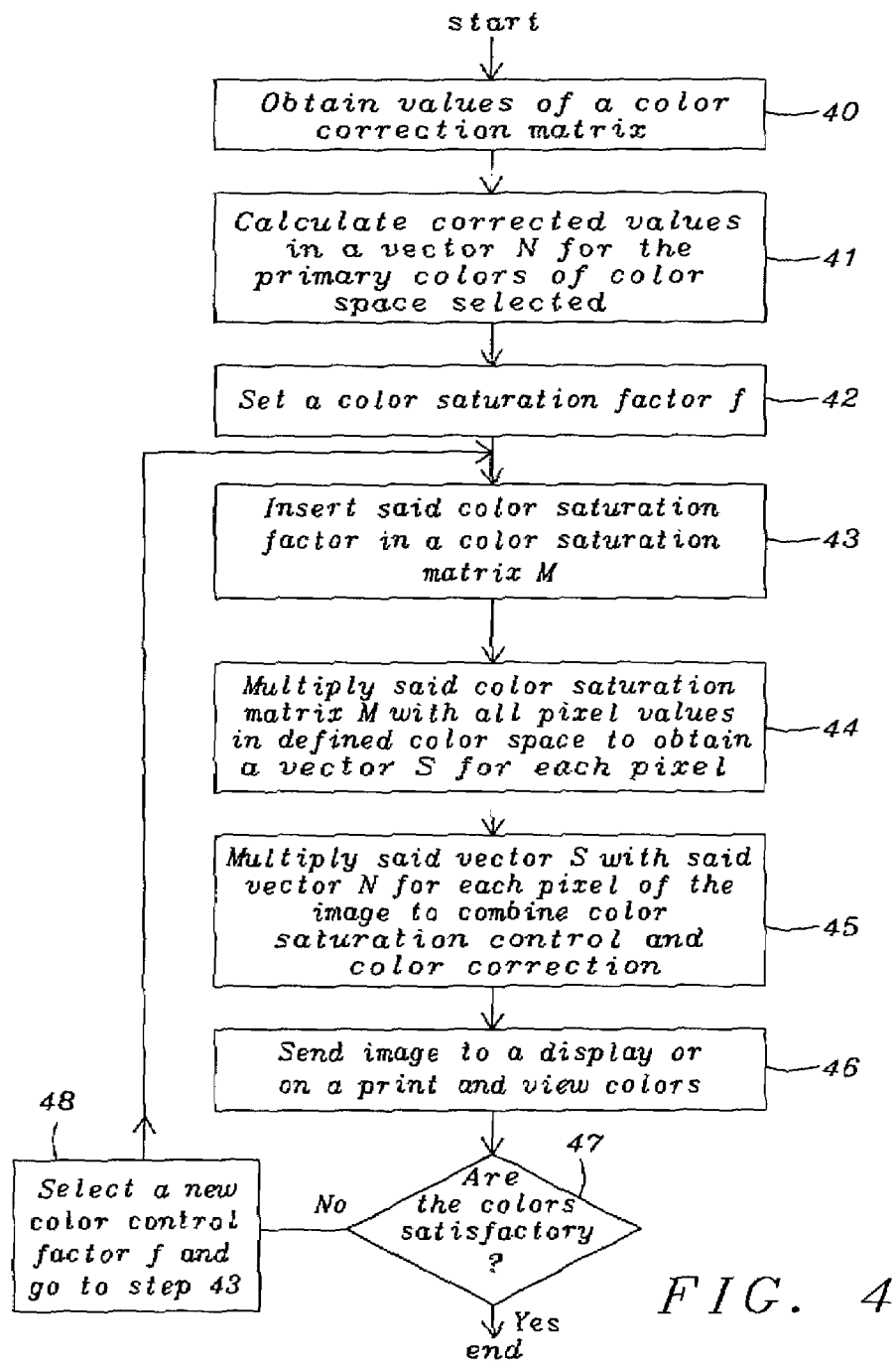
FIG. 4 shows a flowchart of a method to combine color saturation control with a color correction process

FIG. 4 illustrates the method how to combine the color correction with the color saturation control of digital images. In step 40 the values of a color correction matrix are obtained e.g. through imaging of a calibrated target. In the next step 41 a vector N comprising corrected values for three primary colors of the color space selected is calculated. As described above in the section of the saturation control method the next three steps 42, 43 and 44 describe how a color saturation factor f is used to define a color saturation matrix and how all pixels are transformed modifying the saturation described in a vector S for each pixel. In step 45 for each pixel said vector S is multiplied with said correction vector N obtained in step 41 to combine color saturation control and color correction. In step 46 the image is sent to a display or to a print to check the colors obtained in step 47. In case the colors are satisfactory the process is done. In case the colors are not satisfactory a new color saturation factor can be selected in step 48 and the saturation control can be repeated by going back to step 44.

While the invention has been particularly shown and described with reference to the preferred embodiments thereof, it will be understood by those skilled in the art that various changes in form and details may be made without departing from the spirit and scope of the invention.

What is claimed is:

1. A method for a fast color saturation control of digital color images in any color space having three primaries comprising:
    providing an imaging device;
    set a color saturation control factor f;
    insert said color saturation factor in a suitable way in a color saturation matrix M;
    multiply said color saturation matrix with all pixel values of the image in the color space selected;
    send image to a display and view colors; and
    select a new color saturation control factor and repeat process if colors are not satisfactory.

2. The method of claim 1 wherein said display is a print.

3. The method of claim 1 wherein said digital color image has been taken in a digital camera and the color saturation process is being performed using said digital camera.

4. The method of claim 1 wherein said digital color image has been downloaded from any source and the color saturation process is performed by a software embodied in a computer readable medium.

5. The method of claim 1 wherein said color saturation factor f is inserted in said color saturation matrix M in the following way:

$$M = \frac{1}{3} \times \begin{bmatrix} 2f+1 & 1-f & 1-f \\ 1-f & 2f+1 & 1-f \\ 1-f & 1-f & 2f+1 \end{bmatrix}.$$

6. The method of claim 1 wherein the supplier of said imaging device provides said color saturation factor f in a menu to be selected.

7. The method of claim 6 wherein said imaging device is a digital camera.

8. The method of claim 6 wherein said imaging device is a phone.

9. The method of claim 6 wherein said imaging device is a computing device.

10. A method for a fast color saturation control of digital color images in the R-G-B color space comprising:
    providing an imaging device;
    set a color saturation control factor f;
    insert said color saturation factor in a suitable way in a color saturation matrix M;
    multiply said color saturation matrix with all pixel values of the image in R-G-B color space;
    send image to a display and view colors; and
    select a new color saturation control factor and repeat process if colors are not satisfactory.

11. The method of claim 10 wherein said display is a print.

12. The method of claim 10 wherein said digital color image has been taken in a digital camera and the color saturation process is being performed using said digital camera.

13. The method of claim 10 wherein said digital color image has been downloaded from any source and the color saturation process is performed by a software embodied in a computer readable medium.

14. The method of claim 10 wherein said color saturation factor is inserted in said color saturation matrix M in the following way:

$$M = \frac{1}{3} \times \begin{bmatrix} 2f+1 & 1-f & 1-f \\ 1-f & 2f+1 & 1-f \\ 1-f & 1-f & 2f+1 \end{bmatrix}.$$

15. The method of claim 10 wherein the supplier of said imaging device provides said color saturation factor f in a menu to be selected.

16. The method of claim 15 wherein said imaging device is a digital camera.

17. The method of claim 15 wherein said imaging device is a phone.

18. The method of claim 15 wherein said imaging device is a computing device.

19. A method for a fast color saturation control of digital color images in the C-M-Y color space comprising:
    providing an imaging device;
    set a color saturation control factor f;
    insert said color saturation factor in a suitable way in a color saturation matrix M;
    multiply said color saturation matrix with all pixel values of the image in C-M-Y color space;
    send image to a display and view colors; and
    select a new color saturation control factor and repeat process if colors are not satisfactory.

20. The method of claim 19 wherein said display is a print.

21. The method of claim 19 wherein said digital color image has been taken in a digital camera and the color saturation process is being performed using said digital camera.

22. The method of claim 19 wherein said digital color image has been downloaded from any source and the color saturation process is performed by software embodied in a computer readable medium.

23. The method of claim 19 wherein said color saturation factor f is inserted in said color saturation matrix M in the following way:

$$M = \frac{1}{3} \times \begin{bmatrix} 2f+1 & 1-f & 1-f \\ 1-f & 2f+1 & 1-f \\ 1-f & 1-f & 2f+1 \end{bmatrix}.$$

24. The method of claim 19 wherein the supplier of the imaging device provides said color saturation factor f in a menu to be selected.

25. The method of claim 24 wherein said imaging device is a digital camera.

26. The method of claim 24 wherein said imaging device is a phone.

27. The method of claim 24 wherein said imaging device is a computing device.

28. A method to combine a fast color saturation control of digital color images with a color error correction in a color space having three primaries comprising:
    providing an imaging device;
    obtain values of a color correction matrix;

calculate corrected values in a vector N for the primary colors of color space selected;
set a color saturation control factor f;
insert said color saturation factor in a suitable way in a color saturation matrix M;
multiply said color saturation matrix with all pixel values of the image in the color space selected to obtain a vector S for each pixel
multiply said vector S with said vector N for each pixel of the image to combine color saturation control and color correction;
send image to a display and view colors; and
select a new color saturation control factor and repeat color saturation control if colors are not satisfactory.

29. The method of claim 28 wherein said color space is the R-G-B color space.

30. The method of claim 28 wherein said color space is the C-M-Y color space.

31. The method of claim 28 wherein said display is a print.

32. The method of claim 28 wherein said digital color image has been taken in a digital camera and the color saturation process is being performed using said digital camera.

33. The method of claim 28 wherein said digital color image has been downloaded from any source and the color saturation control and the color error correction process is performed by software embodied in a computer readable medium.

34. The method of claim 28 wherein said color saturation factor f is inserted in said color saturation matrix M in the following way:

$$M = \frac{1}{3} \times \begin{bmatrix} 2f+1 & 1-f & 1-f \\ 1-f & 2f+1 & 1-f \\ 1-f & 1-f & 2f+1 \end{bmatrix}.$$

35. The method of claim 28 wherein the supplier of said imaging device provides said color saturation factor f in a menu to be selected.

36. The method of claim 35 wherein said imaging device is a digital camera.

37. The method of claim 35 wherein said imaging device is a phone.

38. The method of claim 35 wherein said imaging device is a computing device.

* * * * *

UNITED STATES PATENT AND TRADEMARK OFFICE
CERTIFICATE OF CORRECTION

| | | |
|---|---|---|
| PATENT NO. | : 7,224,833 B2 | Page 1 of 1 |
| APPLICATION NO. | : 10/271300 | |
| DATED | : May 29, 2007 | |
| INVENTOR(S) | : Anders Johannesson and Ingemar Larsson | |

It is certified that error appears in the above-identified patent and that said Letters Patent is hereby corrected as shown below:

Title Page in the Assignee, Item (73), delete "Dialog Imaging Systems GmbH, Kirchheiml Teck-Nabern (DE)" and replace with -- Dialog Imaging Systems GmbH, Kirchheim/Teck-Nabern (DE) --.

Signed and Sealed this

Seventh Day of August, 2007

JON W. DUDAS
*Director of the United States Patent and Trademark Office*